US010345895B2

(12) United States Patent
Greenberger et al.

(10) Patent No.: US 10,345,895 B2
(45) Date of Patent: Jul. 9, 2019

(54) HAND AND FINGER LINE GRID FOR HAND BASED INTERACTIONS

(71) Applicant: International Business Machines Corporation, Armonk, NY (US)

(72) Inventors: Jeremy A. Greenberger, Raleigh, NC (US); Zachary M. Greenberger, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/805,652

(22) Filed: Nov. 7, 2017

(65) Prior Publication Data

US 2019/0138082 A1    May 9, 2019

(51) Int. Cl.
| | | |
|---|---|---|
| G06F 3/01 | (2006.01) | |
| G06K 9/00 | (2006.01) | |
| G06F 3/03 | (2006.01) | |
| G06T 7/13 | (2017.01) | |

(52) U.S. Cl.
CPC .............. *G06F 3/011* (2013.01); *G06F 3/017* (2013.01); *G06F 3/0304* (2013.01); *G06K 9/00375* (2013.01); *G06T 7/13* (2017.01)

(58) Field of Classification Search
CPC ........ G06F 3/011; G06F 3/017; G06F 3/0304; G06F 3/005; G06F 2203/0331; G06K 9/00375; G06T 7/13
See application file for complete search history.

(56) References Cited

U.S. PATENT DOCUMENTS

| | | | |
|---|---|---|---|
| 6,771,294 B1 * | 8/2004 | Pulli ...................... | G06F 3/011 |
| | | | 345/173 |
| 8,228,315 B1 * | 7/2012 | Starner ................ | G02B 27/017 |
| | | | 345/175 |
| 8,830,312 B2 | 9/2014 | Hummel et al. | |
| 8,971,572 B1 | 3/2015 | Yin et al. | |
| 9,448,620 B2 * | 9/2016 | Kim ......................... | G06F 3/005 |
| 2012/0218395 A1 | 8/2012 | Andersen et al. | |
| 2013/0016070 A1 | 1/2013 | Starner et al. | |
| 2013/0113709 A1 * | 5/2013 | Wine ..................... | G06F 1/163 |
| | | | 345/169 |
| 2013/0257748 A1 | 10/2013 | Ambrus et al. | |
| 2014/0211991 A1 | 7/2014 | Stoppa et al. | |

(Continued)

FOREIGN PATENT DOCUMENTS

| | | |
|---|---|---|
| WO | 2007043036 | 4/2007 |
| WO | 2013012976 | 1/2013 |

OTHER PUBLICATIONS

"List of IBM Patents or Patent Applications Treated as Related," Letter from Leslie A. Van Leeuwen, Dec. 17, 2017, 1 page.

(Continued)

*Primary Examiner* — Stephen G Sherman
(74) *Attorney, Agent, or Firm* — VanLeeuwen & VanLeeuwen; Richaard A. Wilhelm

(57) ABSTRACT

An approach is provided that maps a user's hand into a number of areas. The approach detects when a selection of one of the mapped areas by the user, such as by using a finger from the user's other hand. The approach then identifies an input that corresponds to the area selected by the user. This input is then transmitted to the information handling system for processing.

11 Claims, 7 Drawing Sheets

(56) References Cited

U.S. PATENT DOCUMENTS

2015/0332075 A1* 11/2015 Burch ................ G06K 7/10821
345/156
2015/0363038 A1 12/2015 Luo
2016/0041624 A1 2/2016 Spiessl et al.

OTHER PUBLICATIONS

Greenberger et al., "Hand and Finger Line Grid for Hand Based Interactions," U.S. Appl. No. 15/844,594, filed Dec. 17, 2017, 30 pages.

Duca et al., "Real-Time 3D Hand Interaction: Single Webcam Low-Cost Approach," Proceedings of the Workshop at the IEEE Virtual Reality 2007 Conference, Trends and Issues in Tracking for Virtual Environments, Mar. 2007, 5 pages.

Wu et al., "Multi-Finger and Whole Hand Gestural Interaction Techniques for Multi-User Tabletop Displays," Proceedings of the 16th annual ACM Symposium on User Interface Software and Technology, ACM, Nov. 2003, 10 pages.

Chavez, "New Google Glass patent shows Google toying with hand-gestures to like, crop, and share," Phandroid, Oct. 2013, 4 pages.

* cited by examiner

HAND AND FINGER LINE GRID FOR HAND BASED INTERACTIONS

BACKGROUND OF THE INVENTION

Description of Related Art

Grid based interaction is very common in computing system. Grid creates a logical 2D coordinate in computing system, which helps user to interact with various contents. Grid is also being used for navigating, business intelligence report that includes data clustering, segmentation, line or bar graphs etc. At the same time grids are being used for content navigation. Traditional computer interfaces utilize devices such as track pads and graphics tablets to provide user with grid functionality.

Computer systems are becoming more mobile as well as wearable. Small, mobile computing devices such as smart phones and wearable computing devices are used by many users. Wearable computing devices includes eyeglass computing systems that provide an optical head-mounted display through the glass lenses. Size constraints of many traditional grid-based input devices makes use of such devices impractical when using these small, mobile devices.

SUMMARY

An approach is provided that maps a user's hand into a number of areas. The approach detects when a selection of one of the mapped areas by the user, such as by using a finger from the user's other hand. The approach then identifies an input that corresponds to the area selected by the user. This input is then transmitted to the information handling system for processing.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
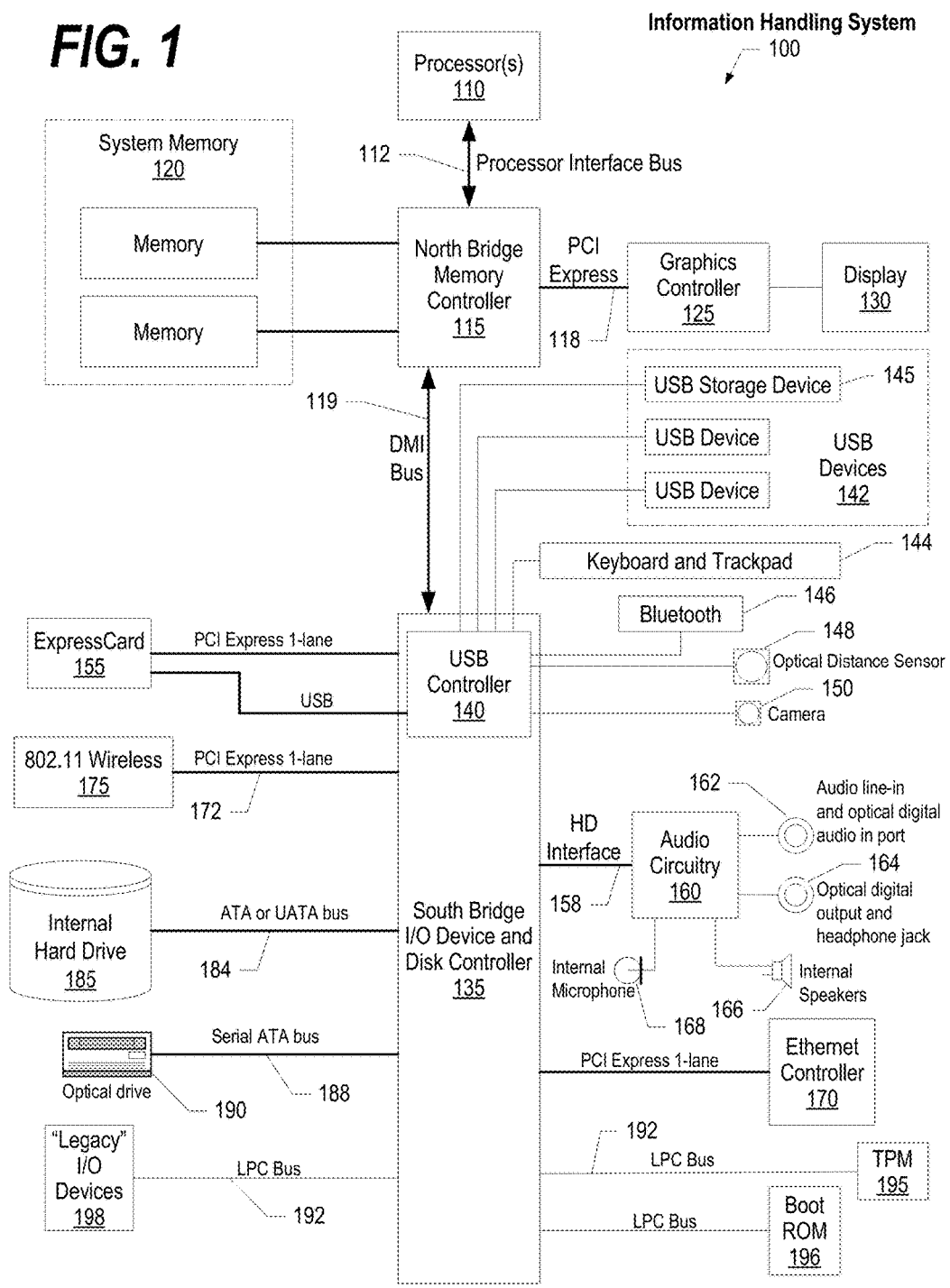
FIG. 1 depicts a block diagram of a network of data processing systems in which illustrative embodiments may be implemented.

FIGS. 1-7 show an approach to map a grid onto a user's hand forming a virtual keypad for a grid-based computing system. When the user's hand is positioned with the user's fingers close to each other, then along with finger lines a grid is formed that can be used to map a virtual keypad. This grid can be used to map different types of virtual keypads, such as a telephone keypad, an alpha keypad, and a numeric keypad that can be easily used by the user, such as by selecting (touching) an area of the hand with the user's other hand. A sensing device accessible from the computing device, such as a digital camera included in either a smart phone or a optical head-mounted display computer system, detects which area of the hand has been selected and retrieves the mapped input, such as a character, digit, or function. In addition, a hand gesture, such as the user forming a first with the hand, can be used to switch from one virtual keypad to another. In this manner, the user can switch from having a virtual alpha keypad mapped to the user's hand to having a virtual numeric keypad mapped to the user's hand, and vise-versa, with the use of such a gesture. In addition, an area of the hand, such as the heel of the hand, etc., can be reserved for switching keypads so that when the reserved area is selected the virtual keypad is switched from one keypad to another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
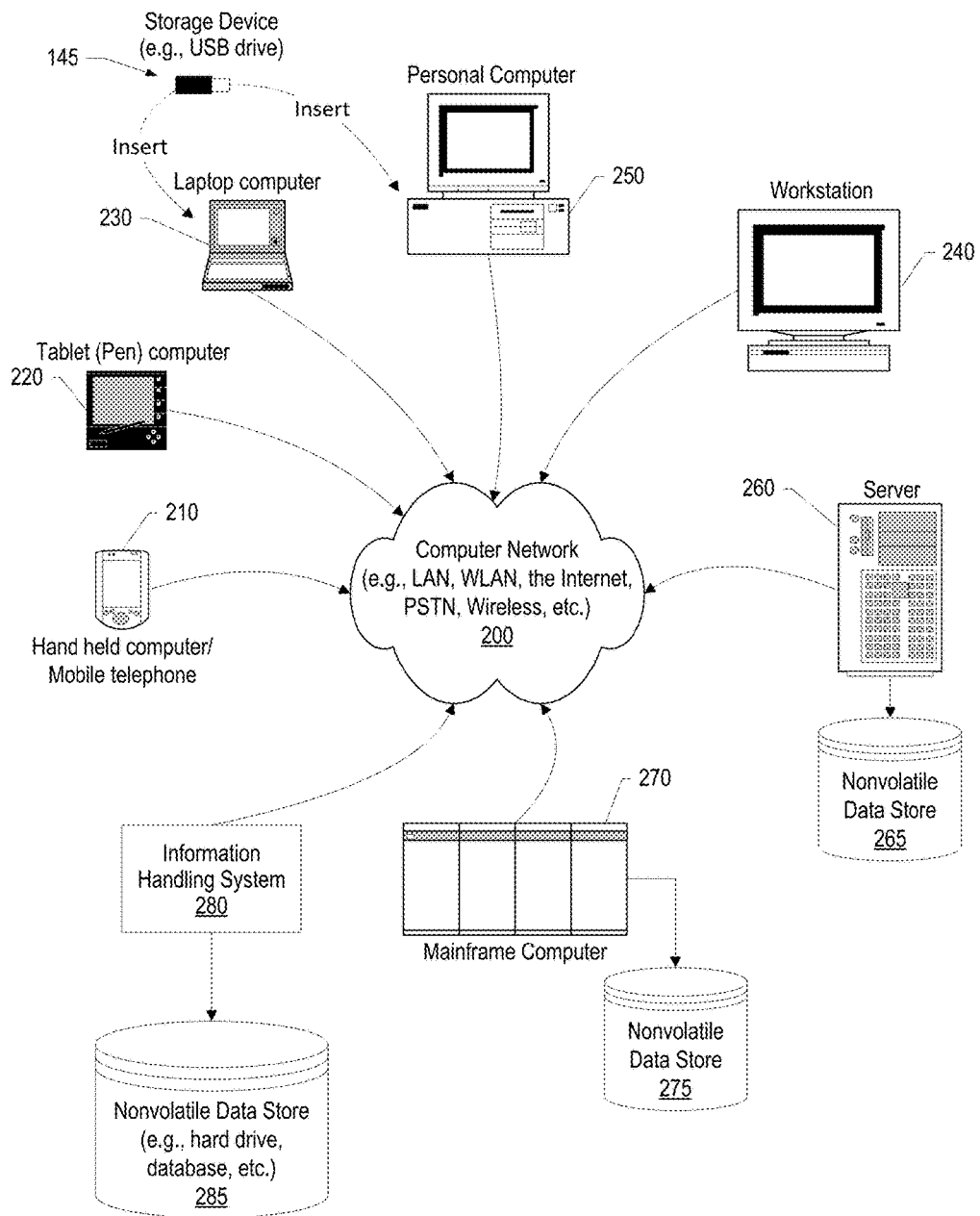
FIG. 2 depicts a block diagram of a data processing system in which illustrative embodiments may be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3A:
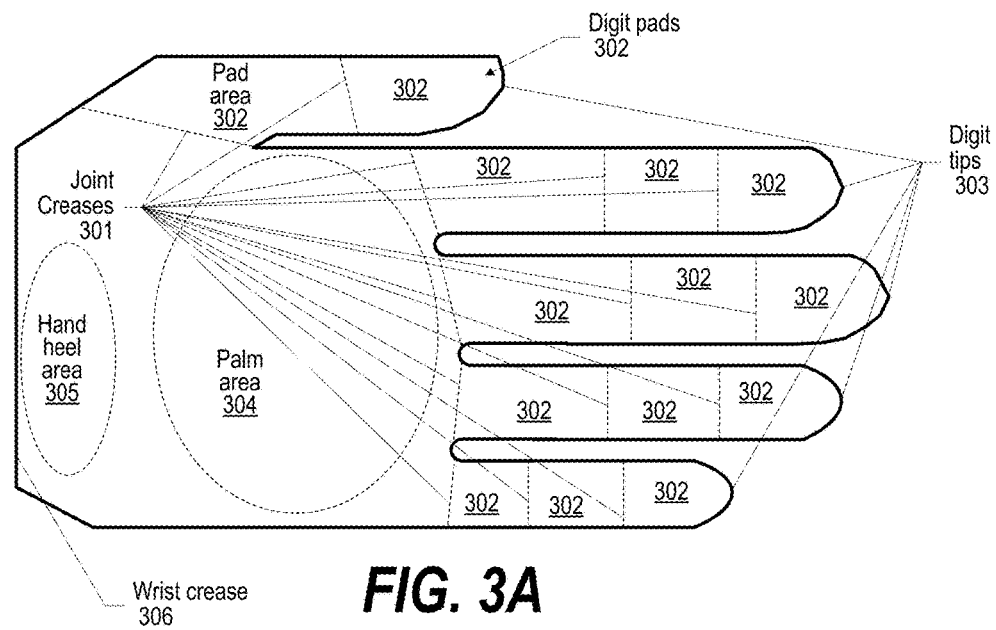
FIG. 3A depicts a user's hand being mapped into a number of input areas.

FIG. 3A depicts a user's hand being mapped into a number of input areas. Joint creases 301 are automatically detected by a digital camera that captures an image of the palmar side of the user's hand and then detects creases 301 formed at finger joints. The areas between the joint creases are identified as digit pads 302 with one digit pad being between a joint crease found on each digit (fingers, thumb) and the digit tips 303.

Hand heel area 305 is identified as the area of the hand adjacent to wrist crease 306 that is identified between the user's wrist and the hand, with palm area 304 of the user's hand being identified as an area between hand heel area 305 and the first joint creases formed by the extension of the respective digits. In one embodiment, joint creases 301, digit pads 302, digit tips 303, palm area 304, hand heel area 305, and wrist crease 306 can each be mapped as an input area selectable by the user forming well over thirty input areas that can be mapped and made selectable by the user for input to the information handling system.

Figure 3B:
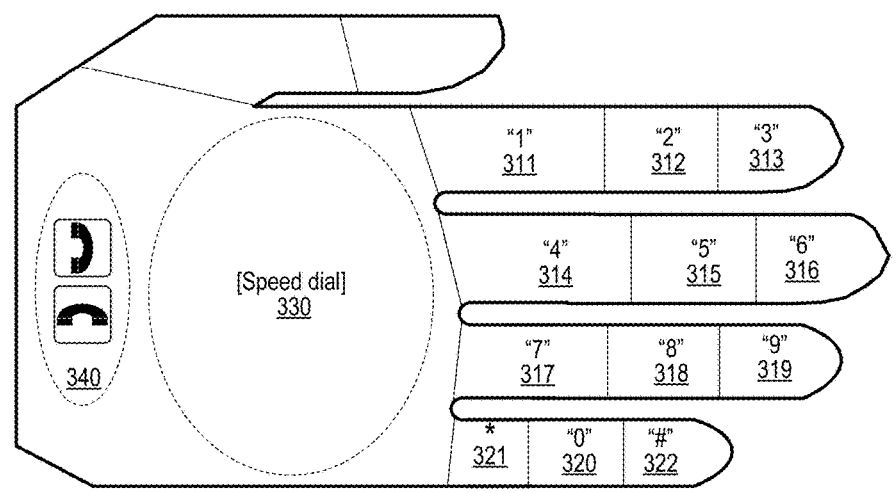
FIG. 3B depicts a virtual telephone keypad mapped to different areas of the user's hand.

FIG. 3B depicts a virtual telephone keypad mapped to different areas of the user's hand. FIG. 3B is one example of an implementation using hand areas as selectable input areas. In this example, the number '1' has been mapped to digit pad area 311, the number '2' has been mapped to digit pad area 312, the number '3' has been mapped to digit pad area 313, the number '4' has been mapped to digit pad area 314, the number '5' has been mapped to digit pad area 315, the number '6' has been mapped to digit pad area 316, the number '7' has been mapped to digit pad area 317, the number '8' has been mapped to digit pad area 318, the number '9' has been mapped to digit pad area 319, and the number '0' has been mapped to digit pad area 320. In addition, the "star" key has been mapped to digit pad area 321, and the "pound sign" key has been mapped to digit pad area 322.

Two other areas have been mapped to provide telephone functionality. Palm area 330 has been mapped to invoke speed dial functionality on the user's phone, and hang-up/pick-up functionality has been mapped to hand heel area 340. When using a mobile device equipped with a digital camera, such as an eyeglass based information handling system, the device enters a virtual telephone application so that the user can make a telephone call. The digital camera detects the user selecting the various numbers and telephone function areas mapped to the user's hand and, using these inputs, makes a phone call at the user's information handling system, such as the eyeglass-based information handling system previously referenced. Other examples of inputs mapped to the user's hand are discussed in FIG. 4, including the ability for the user to switch from one virtual keypad to another.

Figure 4:
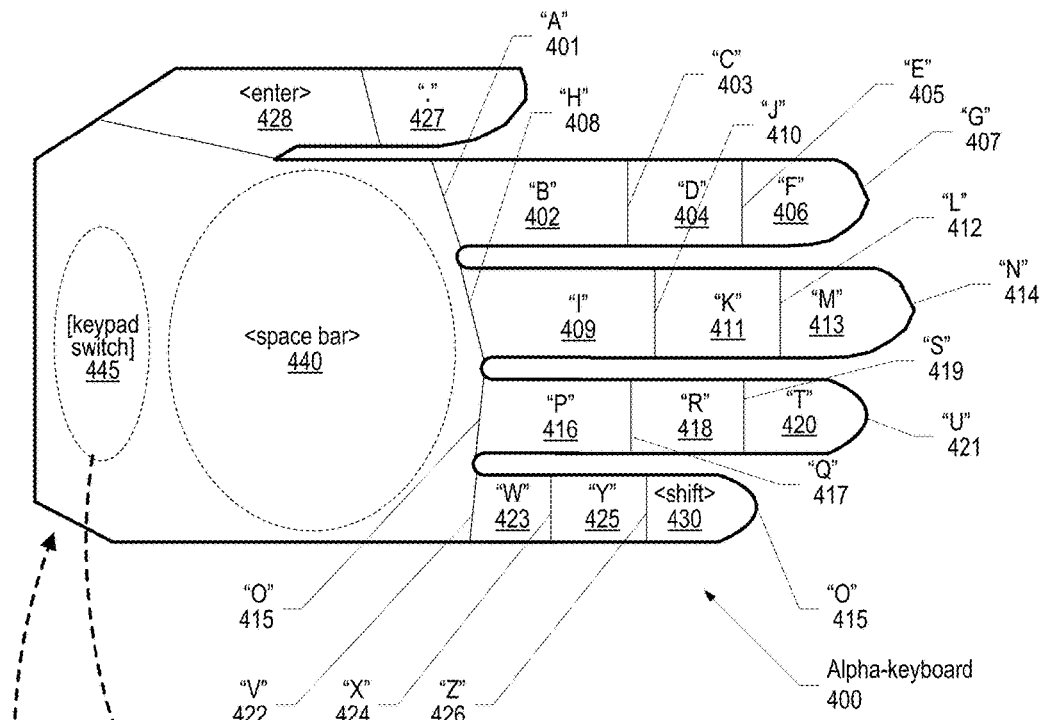
FIG. 4 depicts two virtual keypads on a user's hand, a first being an alpha-keypad mapped to different areas of the user's hand with a virtual keypad switch used to change the mapping to that of a numeric keypad.
Figure 4:
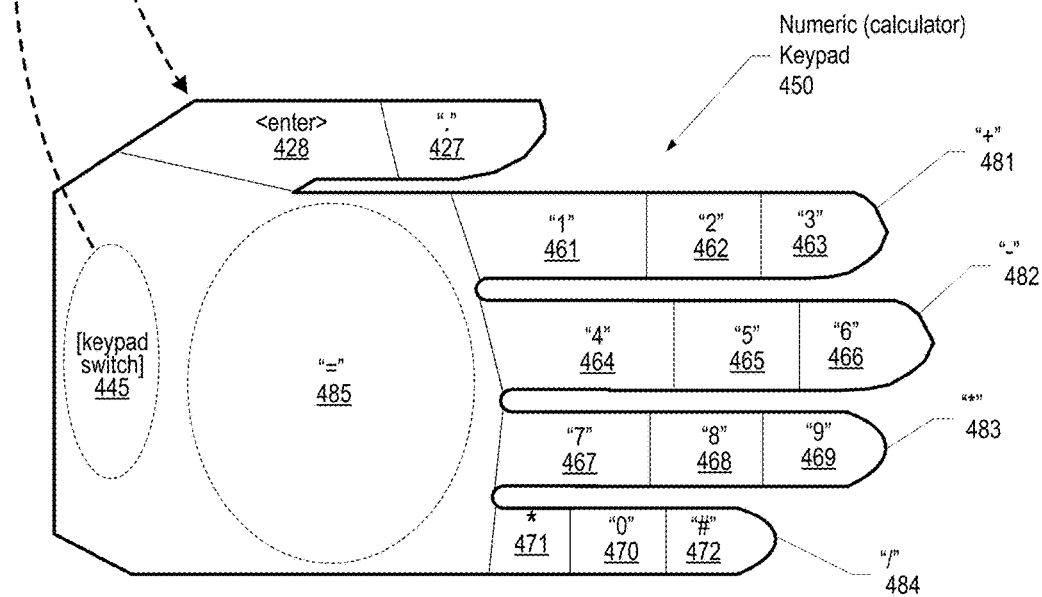

FIG. 4 depicts two virtual keypads on a user's hand, a first being an alpha-keypad mapped to different areas of the user's hand with a virtual keypad switch used to change the mapping to that of a numeric keypad. Alpha-keypad 400 maps primarily alphabetic virtual keys, while numeric keypad 450 primarily maps numeric virtual keys to the user's hand. A gesture or area of the hand is used to perform a keyboard switch that, when utilized, changes the mapping from alpha to numeric and vise-versa. A gesture can be used instead of having a mapped hand area used to perform the keyboard switch. In one embodiment, the hand gesture is a "fist" gesture so that when the user makes a first out of the hand that has been mapped with the virtual keypad, when the first is released and the hand returned to the position shown in FIG. 4, then the other keypad is mapped to the user's hand.

When the alpha keypad is used, as shown in example hand mapping 400, the letter 'A' is mapped to hand area 401, the letter 'B' is mapped to hand area 402, the letter 'C' is mapped to hand area 403, the letter 'D' is mapped to hand area 404, the letter 'E' is mapped to hand area 405, the letter 'F' is mapped to hand area 406, the letter 'G' is mapped to hand area 407, the letter 'H' is mapped to hand area 408, the letter 'I' is mapped to hand area 409, the letter 'J' is mapped to hand area 410, the letter 'K' is mapped to hand area 411, the letter 'L' is mapped to hand area 412, the letter 'M' is mapped to hand area 413, the letter 'N' is mapped to hand area 414, the letter 'O' is mapped to hand area 415, the letter 'P' is mapped to hand area 416, the letter 'Q' is mapped to hand area 417, the letter 'R' is mapped to hand area 418, the letter 'S' is mapped to hand area 419, the letter 'T' is mapped to hand area 420, the letter 'U' is mapped to hand area 421, the letter 'V' is mapped to hand area 422, the letter 'W' is mapped to hand area 423, the letter 'X' is mapped to hand area 424, the letter 'Y' is mapped to hand area 425, and the letter 'Z' is mapped to hand area 426. Additionally, the shift key is mapped to hand area 427, the period character is mapped to hand area 428, the comma character is mapped to hand area 429, the enter key is mapped to hand area 430, and the space bar key is mapped to hand area 440.

To switch between keypads, a gesture, such as the "fist" gesture described above, can be used or a hand area can be reserved and mapped for switching keypad contexts. In the example shown, hand area 445 has been mapped in both keypads to switch between the virtual keypad mappings onto the hand areas. So, when the user is using alpha keypad 400 and wishes to use numeric keypad mappings 450, the user selects hand area 445, such as by touching the area (the heel of the hand as shown in the example) using a pointing device, such as a finger from the user's other hand. Once selected, numeric keypad mappings 450 are mapped to the user's hand. Notice that some of the mappings might remain constant between keypads. In the example shown, hand areas 430 (enter key), 428 (period key), and 445 (keypad switch) are constant between the two keypads.

When the numeric keypad has been selected by the user, then numeric keys are mapped to the hand areas as shown in example keypad 450. In this example, the number '1' has been mapped to hand area 461, the number '2' has been mapped to hand area 462, the number '3' has been mapped to hand area 463, the number '4' has been mapped to hand area 464, the number '5' has been mapped to hand area 465, the number '6' has been mapped to hand area 466, the number '7' has been mapped to hand area 467, the number '8' has been mapped to hand area 468, the number '9' has been mapped to hand area 469, and the number '0' has been mapped to hand area 470. In addition, the "star" key has been mapped to hand area 471, and the "pound sign" key has been mapped to hand area 472. Additionally, calculator functions have been mapped to various hand areas including addition ("+") function mapped to hand area 481, subtraction ("−") function mapped to hand area 482, multiplication ("*") function mapped to hand area 483, division ("/") function mapped to hand area 484, as well as hand area 485 (palm area) being been mapped to be the equal ("="), or calculate, function.

For example, once numeric keypad 450 has been activated, the user could press the hand area 464 (the "4" key), followed by hand area 483 (the multiply function), followed by hand area hand area 469 (the "9" key), concluded by selecting hand area 485 (the calculate function) at which point the answer ("36") would display to the user on the user's mobile device, such as an eyeglass-based information handling system.

Figure 5:
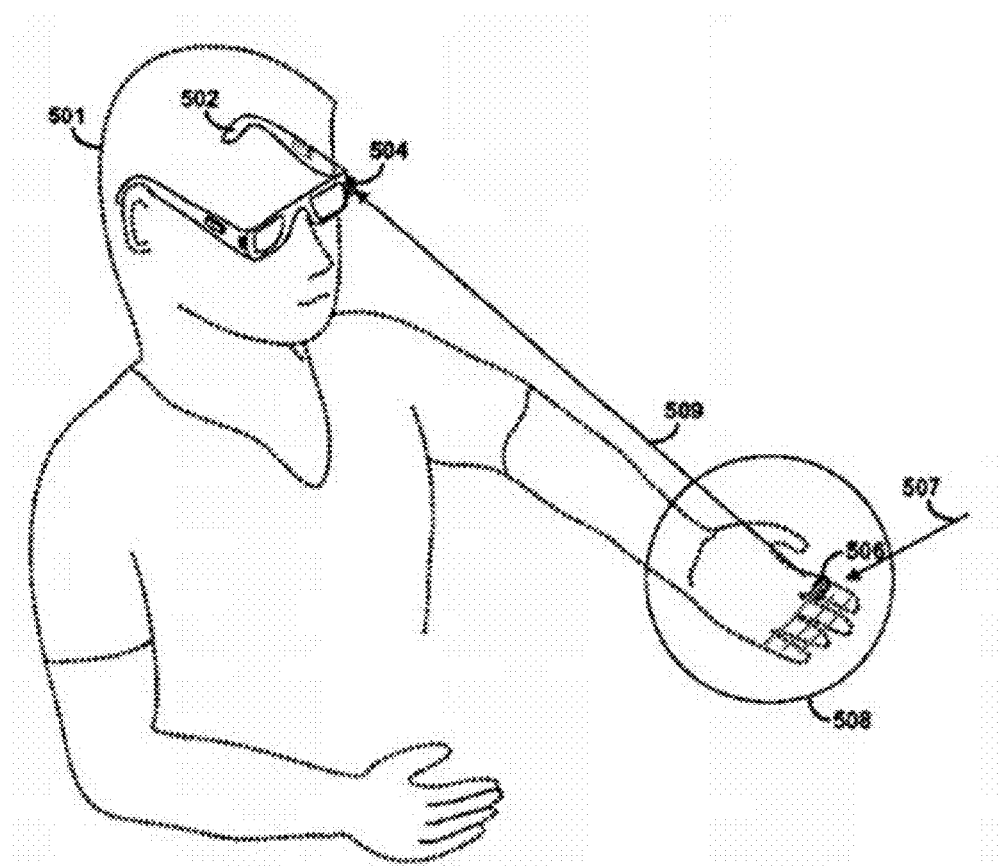
FIG. 5 depicts selection of keypad areas mapped to the user's hand with the selection being detected by an eyeglass computing system that provides an optical head-mounted display through the glass lenses that detects the area of the hand being selected.

FIG. 5 depicts selection of keypad areas mapped to the user's hand with the selection being detected by an eyeglass computing system that provides an optical head-mounted display through the glass lenses that detects the area of the hand being selected. User 501 is wearing eyeglass based information handling system 502 that includes digital camera 504 that captures a digital image 509 of the user's hand 508. The hand areas 507 of the user's hand are determined from the image captured of the user's hand. When a hand area, such as hand area 506, is selected, the selection is detected by digital camera 504 and the mapped input is transmitted to the information handling system, such as the numbers and numeric functions shown in the example described with respect to FIG. 4, above. Eyeglass based information handling system 502 provides a heads-up display that displays information to the user on the lenses of the eyeglasses. So, the inputs received by the user's selection are displayed on the lenses when the selections are made and any results, such as the results of the calculation from the example described in FIG. 4, are also displayed on the lenses of the eyeglass based information handling system.

Figure 6:
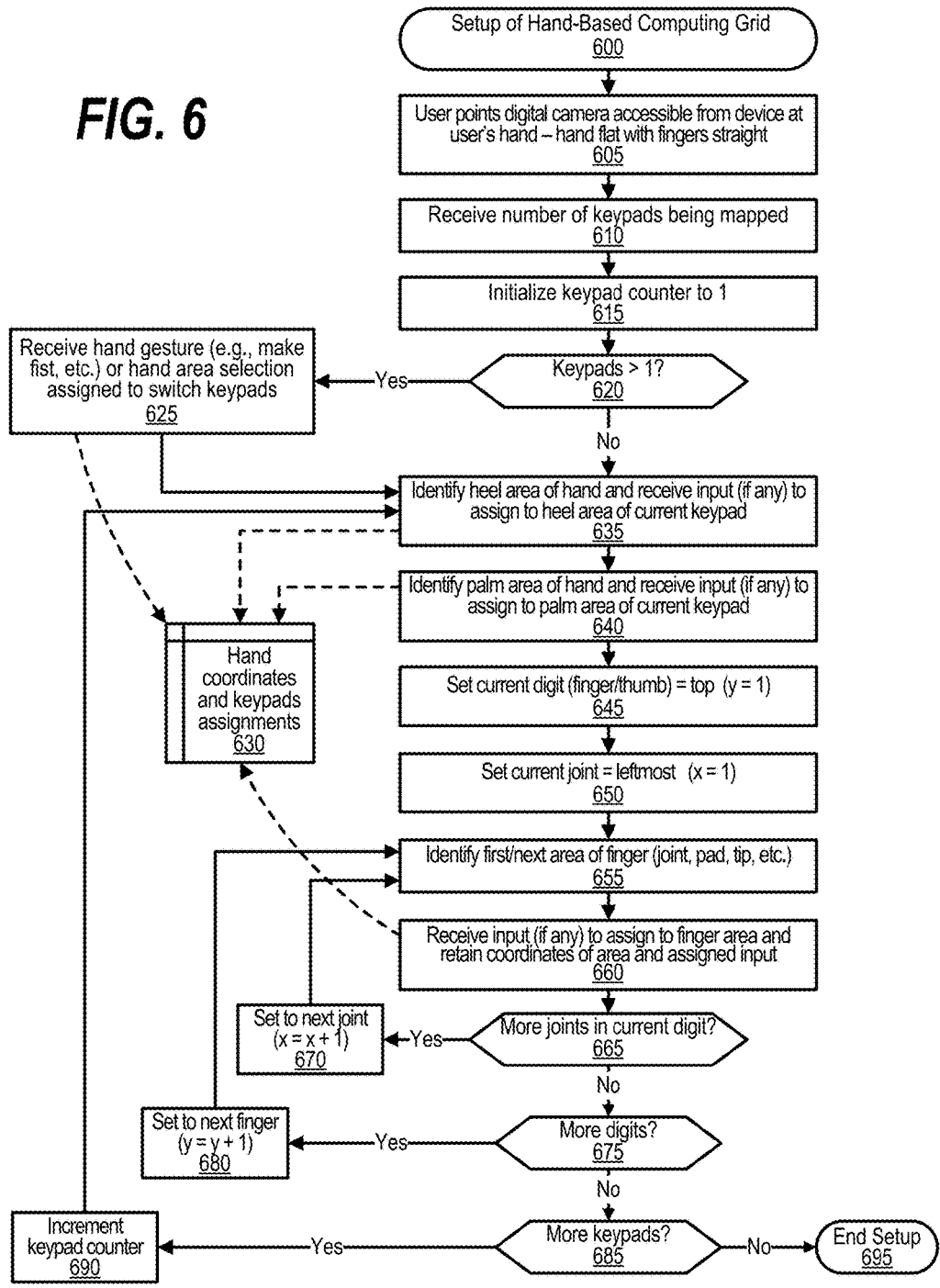
FIG. 6 depicts a flowchart showing details of setting up the hand-based computing grid.

FIG. 6 depicts a flowchart showing details of setting up the hand-based computing grid. FIG. 6 processing commences at 600 and shows the steps taken by a process that sets up the hand-based computing grid. At step 605, the user points the digital camera accessible from the information handling system at the user's hand with the hand being positioned flat with fingers straight. At step 610, the process receives number of keypads that are being mapped from the user. At step 615, the process initializes keypad counter to one to map the first keypad. The process determines as to whether more than one keypads are being mapped (decision 620). If more than one keypads are being mapped, then decision 620 branches to the 'yes' branch which branches to 'yes' branch to perform step 625 whereupon at step 625, the process receives the hand gesture (e.g., make fist, etc.) or the hand area selection that is being assigned to switch keypads. Details regarding the number of keypads and the particular hand area mappings on each hand-based keypad are stored in memory area 630. On the other hand, if only one keypad is being mapped, then decision 620 branches to the 'no' branch bypassing step 625.

At step 635, the process identifies the heel area of the user's hand and receives input from the user (if any) to assign to the heel area of current keypad. At step 640, the process identifies the palm area of the user's hand and receive input (if any) to assign to the palm area of current keypad. The hand areas identified and the inputs mapped to the hand areas in steps 635 and 640 are stored in memory area 630. At step 645, the process sets the current digit (finger/thumb) to be the top digit.

At step 650, the process sets the current joint of the current digit to be the leftmost joint. At step 655, the process identifies the first area of finger (finger joint crease, finger pad, finger tip, etc.). At step 660, the process receives the input (if any) to assign to the finger area and retains the coordinates of the hand area and the assigned input to memory area 630. The process determines as to whether there are more joints in current digit (decision 665). If there are more joints in current digit, then decision 665 branches to the 'yes' branch which increments the hand area to the next joint of the current hand (step 670) and loops back to step 655 to process the hand areas defined by the next joint crease. This looping continues until there are no more joints in current digit, at which point decision 665 branches to the 'no' branch exiting the loop.

The process determines as to whether more digits on the user's hand to process (decision 675). If there are more digits to process, then decision 675 branches to the 'yes' branch which selects the next digit (e.g., finger, etc.) at step 680 and loops back to step 655 to process the newly selected digit. This looping continues until there are no more digits to process, at which point decision 675 branches to the 'no' branch exiting the loop. The process determines as to whether the user has indicated a desire to setup additional keypads (decision 685). If more keypads are being configured, then decision 685 branches to the 'yes' branch whereupon the keypad number is incremented (step 690) and processing then loops back to step 635 to receive the hand-based keypad mappings for the next virtual keypad being mapped to the user's hand. This looping continues until no more keypads are being configured, at which point decision 685 branches to the 'no' branch exiting the loop and setup processing ends at 695.

Figure 7:
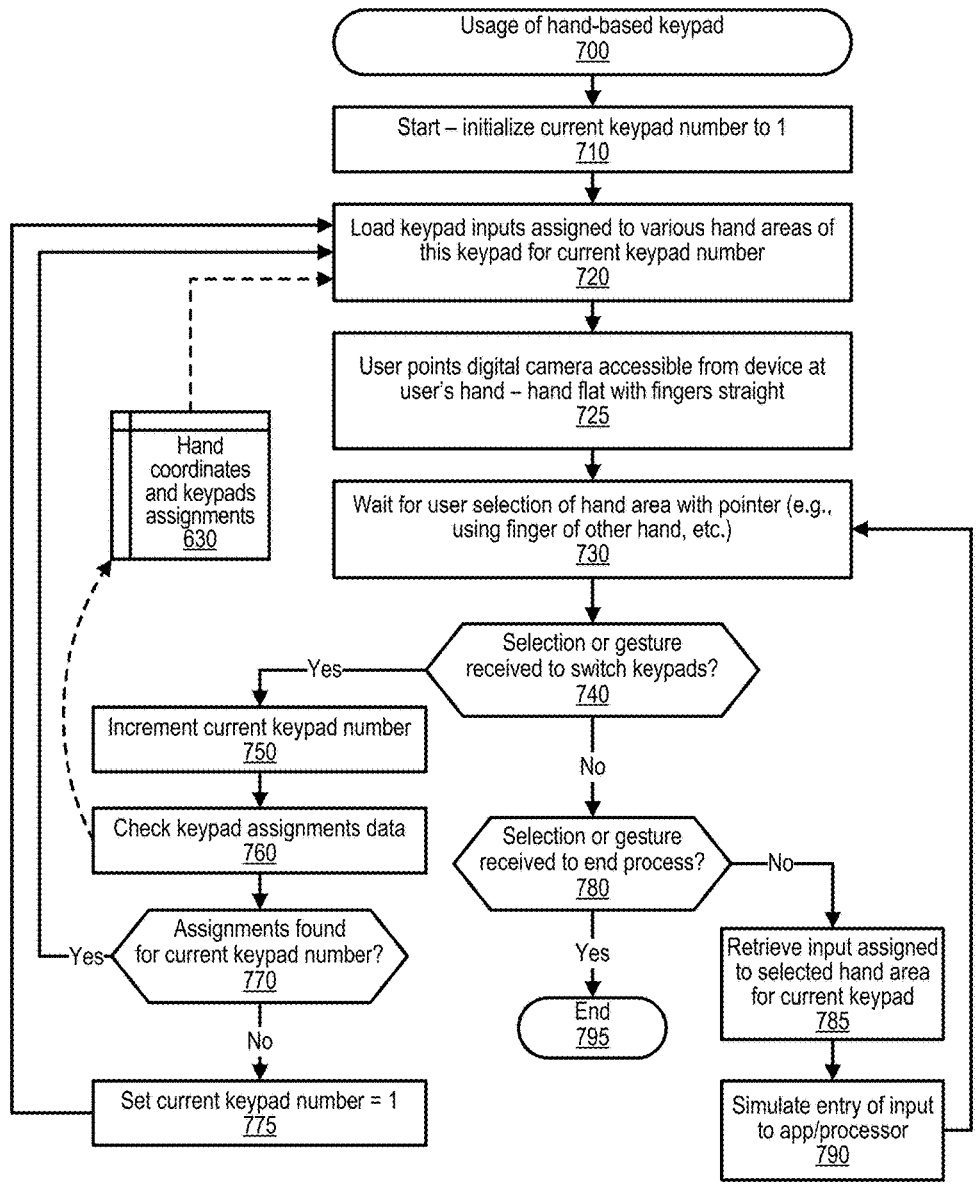
FIG. 7 depicts a flowchart showing details of utilizing a virtual hand-based keypad mapped to a user's hand.

FIG. 7 depicts a flowchart showing details of utilizing a virtual hand-based keypad mapped to a user's hand. FIG. 7 processing commences at 700 and shows the steps taken by a process that uses hand-based keypad mappings with an information handling system, such as an eyeglass-based information handling system. At step 710, the process initializes current keypad number to one. At step 720, the process loads the keypad inputs assigned to various hand areas of this keypad for current keypad number. These inputs are mapped to the various hand areas so that when a particular hand area is selected, the input mapped to such area is transmitted to the information handling system for use in processing, such as a number, letter, or function. The hand areas and corresponding mappings are retrieved from memory area 630. At step 725, the user points the digital camera that is accessible from the user's eyeglass-based information handling system at the user's hand with the hand being positioned flat with fingers straight. At step 730, the process waits for a user selection of one of the hand areas with use of a pointer, such as a finger from the other hand of the user, etc. The process determines as to whether a hand area selection or hand gesture was received to switch keypads (decision 740). If the selection or gesture was received to switch keypads, then decision 740 branches to the 'yes' branch to perform steps 750 through 775. On the other hand, if the selection was not to switch keypads, then decision 740 branches to the 'no' branch to perform steps 780 through 795. Steps 750 through 775 are performed when the user has requested to switch keypads. At step 750, the process increments the current keypad number. At step 760, the process checks the keypad assignments data found in memory area 630. The process determines whether hand area assignments found for the current keypad number (decision 770). If hand area assignments are found for the current keypad number, then decision 770 branches to the 'yes' branch whereupon processing loops back to step 720 to load the hand area mappings corresponding to the newly requested virtual keypad (e.g., the numeric keypad instead of the alpha keypad). On the other hand, if no assignments are found for the current keypad number, then decision 770 branches to the 'no' branch whereupon the current keypad number is reset to one and processing loops back to step 720 to load the hand area mappings corresponding to the first keypad. Steps 780 through 795 are performed when the user has selected a hand area that is not assigned to switch keypads. The process determines whether a selection or gesture was received to end the hand based keypad process (decision 780). If a selection or gesture was received to end the hand based keypad process, then decision 780 branches to the 'yes' branch whereupon processing ends at 795. On the other hand, if another hand area selection was received, then decision 780 branches to the 'no' branch to perform steps 785 and 790. At step 785, the process retrieves the input assigned (mapped to) to hand area for current keypad with the hand area having been selected by the user. At step 790, the process simulates entry of the input to the information handling system such as an application that is currently executing (e.g., calculator app, phone app, text message app, etc.).

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a digital camera accessible by at least one of the processors;
   a memory coupled to at least one of the processors; and
   a set of computer program instructions stored in the memory and executed by at least one of the processors in order to perform actions comprising:
      mapping a user's hand into a plurality of areas and at least one keypad switch area;
      assigning a first set of virtual keys to the plurality of areas;
      in response to detecting a keypad switch selection on the keypad switch area, reassigning the plurality of areas from the first set of virtual keys to a second set of virtual keys;
      detecting, by the digital camera, a selection of one of the plurality of areas assigned to a selected one of the second set of virtual keys;
      identifying an input corresponding to the selected one of the second set of virtual keys; and
      transmitting the identified input to the information handling system.

2. The information handling system of claim 1 further comprising:
   configuring a plurality of keypads wherein each of the keypads includes a different plurality of virtual keys.

3. The information handling system of claim 1 wherein the keypad switch request includes a detection of a hand gesture made by the user's hand that is mapped to the plurality of areas.

4. The information handling system of claim 1 wherein the detecting is performed by a digital camera that is included in the information handling system and accessible by the processor.

5. The information handling system of claim 1 further comprising:
   configuring the plurality of areas of the user's hand by detecting hand and finger creases found on the user's hand that separates the user's hand into the plurality of areas, wherein the detecting is performed by a digital camera that is included in the information handling system and accessible by the processor.

6. The information handling system of claim 1 wherein the information handling system is communicatively coupled with a camera, the actions further comprising:
   capturing a first image of a palmar side of the user's hand, the first image including a first finger of the user's hand;
   determining, in the first image, a first and a second side edges of the first finger, a proximal digital crease of the first finger, a middle digital crease of the first finger, a distal digital crease of the first finger, and a tip edge of the first finger, wherein:
      a first area of the plurality of areas is defined by the first side edge, the second side edge, the proximal digital crease, and the middle digital crease of the first finger, a second of the plurality of areas is defined by the first side edge, the second side edge, the middle digital crease, and the distal digital crease of the first finger, and a third area of the plurality of areas is defined by the first side edge, the second side edge, the distal digital crease, and the tip edge of the first finger;
   causing the camera to capture a second image of the palmar side of the user's hand, the second image including the first finger of the user's hand;
   determining whether the second image includes an object overlaid in one of the first, second, or third areas; and
   in response to determining that the second image includes an object overlaid in one of the first, second, or third regions, causing the input corresponding to the area in which the object is overlaid to be provided to an application program executing on the information handling system.

7. A computer program product stored in a non-transitory computer readable storage medium, comprising computer program code that, when executed by an information handling system, performs actions comprising:
   mapping a user's hand into a plurality of areas and at least one keypad switch area;
   assigning a first set of virtual keys to the plurality of areas;
   in response to detecting a keypad switch selection on the keypad switch area, reassigning the plurality of areas from the first set of virtual keys to a second set of virtual keys;
   detecting a selection of one of the plurality of areas assigned to a selected one of the second set of virtual keys;
   identifying an input corresponding to the selected one of the second set of virtual keys; and
   transmitting the identified input to the information handling system.

8. The computer program product of claim 7 further comprising:
   configuring a plurality of keypads wherein each of the keypads includes a different plurality of virtual keys.

9. The computer program product of claim 7 wherein the keypad switch request includes a detection of a hand gesture made by the user's hand that is mapped to the plurality of areas.

10. The computer program product of claim 7 further comprising:
    configuring the plurality of areas of the user's hand by detecting hand and finger creases found on the user's hand that separates the user's hand into the plurality of areas, wherein the detecting is performed by a digital camera that is included in the information handling system and accessible by the processor.

11. The computer program product of claim 7 wherein the information handling system is communicatively coupled with a camera, the actions further comprising:
    capturing a first image of a palmar side of the user's hand, the first image including a first finger of the user's hand;
    determining, in the first image, a first and a second side edges of the first finger, a proximal digital crease of the first finger, a middle digital crease of the first finger, a distal digital crease of the first finger, and a tip edge of the first finger, wherein:
       a first area of the plurality of areas is defined by the first side edge, the second side edge, the proximal digital crease, and the middle digital crease of the first finger, a second of the plurality of areas is defined by the first side edge, the second side edge, the middle digital crease, and the distal digital crease of the first finger, and a third area of the plurality of areas is defined by the first side edge, the second side edge, the distal digital crease, and the tip edge of the first finger;

causing the camera to capture a second image of the palmar side of the user's hand, the second image including the first finger of the user's hand;

determining whether the second image includes an object overlaid in one of the first, second, or third areas; and in response to determining that the second image includes an object overlaid in one of the first, second, or third regions, causing the input corresponding to the area in which the object is overlaid to be provided to an application program executing on the information handling system.

\* \* \* \* \*